US012705803B2

(12) United States Patent
Suzuki

(10) Patent No.: US 12,705,803 B2
(45) Date of Patent: Aug. 11, 2026

(54) PSEUDO VASCULAR PATTERN GENERATION DEVICE AND METHOD OF GENERATING PSEUDO VASCULAR PATTERN

(71) Applicant: FUJITSU FRONTECH LIMITED, Inagi (JP)

(72) Inventor: Tomoharu Suzuki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 147 days.

(21) Appl. No.: 18/647,019

(22) Filed: Apr. 26, 2024

(65) Prior Publication Data

US 2024/0296597 A1 Sep. 5, 2024

Related U.S. Application Data

(63) Continuation of application No. PCT/JP2021/048352, filed on Dec. 24, 2021.

(51) Int. Cl.

| | |
|---|---|
| ***G06T 11/00*** | (2026.01) |
| ***G06T 3/00*** | (2006.01) |
| ***G06T 5/20*** | (2006.01) |
| ***G06V 10/776*** | (2022.01) |
| ***G06V 40/14*** | (2022.01) |

(52) U.S. Cl.

CPC ................ *G06T 11/00* (2013.01); *G06T 3/00* (2013.01); *G06T 5/20* (2013.01); *G06V 10/776* (2022.01); *G06V 40/14* (2022.01)

(58) Field of Classification Search

CPC . G06T 1/00; G06T 11/001; G06T 5/20; G06T 3/00; G06T 11/00; G06T 2207/30101; G06V 40/14; G06V 10/776

See application file for complete search history.

(56) References Cited

U.S. PATENT DOCUMENTS

| | | | | |
|---|---|---|---|---|
| 10,008,011 | B1 * | 6/2018 | Balestrieri | G06T 11/001 |
| 2005/0104900 | A1 * | 5/2005 | Toyama | G06T 5/90 345/605 |

(Continued)

FOREIGN PATENT DOCUMENTS

| | | |
|---|---|---|
| CN | 102156960 A * | 8/2011 |
| JP | 2011-188222 | 9/2011 |
| JP | 2015-212440 | 11/2015 |

OTHER PUBLICATIONS

Makoto Sato, “A Practical Introduction to Mathematical Life Sciences”, MATLAB Programming to Simulations; vol. 4, pp. 176-193<.

(Continued)

*Primary Examiner* — Kee M Tung
*Assistant Examiner* — Nauman U Ahmad
(74) *Attorney, Agent, or Firm* — STAAS & HALSEY LLP

(57) ABSTRACT

In a pseudo vascular pattern generation device 10, a processor 11 generates a first image in which white noise has been added to a gray image, generates a second image in which the white noise included in the first image has been diffused, generates a third image in which a blood vessel enhancement filter has been applied to the second image, generates a fourth image in which a region of interest has been set to the third image, and generates a fifth image including the pseudo vascular pattern based on the fourth image.

4 Claims, 9 Drawing Sheets

(56) References Cited

U.S. PATENT DOCUMENTS

| | | | | |
|---|---|---|---|---|
| 2008/0112597 | A1* | 5/2008 | Asano | G06V 40/63 382/115 |
| 2009/0201516 | A1* | 8/2009 | Takahashi | G09G 5/006 358/1.9 |
| 2016/0055619 | A1* | 2/2016 | Lin | G06T 3/10 345/591 |
| 2016/0345819 | A1* | 12/2016 | Jayasundera | G06T 7/12 |

OTHER PUBLICATIONS

Mami Kawakami, GIMP 7:1, Ist Edition. Shuwa System Co., Ltd. Mar. 26, 2011, pp. 124-130, ISBN 978-4-7980-2871-2, non-official translation+.

Masaki Iwahashi Texlurlsm. CG World. Oct. 1, 2010, vol. 146. pp. 54-57. non-official translation+.

International Search Report issued in International Application No. PCT/JP2021/048352 dated Mar. 1, 2022.

Written Opinion issued in International Application No. PCT/JP2021/048352 dated Mar. 1, 2022.

Lorenza Bonaldi et al., “Automatic Generation of Synthetic Retinal Fundus Images Vascular Network”, Procedia Computer Science, vol. 90, Jul. 25, 2016, pp. 54-60, XP029654586, DOI: 10.1016/J.PROCS.2016.07.010.

Miguel A. Galarreta-Valverde et al., “Three-dimensional synthetic blood vessel generation using stochastic L-systems”, Proceedings of SPIE—Society of Photo-Optical Instrumentation Engineers (SPIE), vol. 8669, Mar. 13, 2013, pp. 866911-866916, XP055533406, DOI: 10.1117/1 2.2007532.

Extended European Search Report issued in counterpart European Application No. 21969084.9 dated Dec. 13, 2024.

* cited by examiner

Ig
GEOMETRIC TRANSFORMATION (Pa)
GEOMETRIC TRANSFORMATION (Pb)
GEOMETRIC TRANSFORMATION (Pc)
BV11
BV12
BV13
n=1, m=1
n=1, m=2
n=1, m=3

100%
90%
80%
70%
60%
50%
40%
30%
20%
10%
0%
-0.3000
-0.2950
-0.2900
-0.2850
-0.2800
-0.2750
-0.2700
-0.2650
-0.2600
-0.2550
-0.2500
-0.2450
-0.2400
-0.2350
-0.2300
-0.2250
-0.2200
-0.2150
-0.2100
-0.2050
-0.2000
-0.1950
-0.1900
-0.1850
-0.1800
-0.1750
-0.1700
-0.1650
-0.1600
-0.1550
-0.1500
-0.1450
-0.1400
-0.1350
-0.1300
-0.1250
-0.1200
-0.1150
-0.1100
-0.1050
-0.1000
-0.0950
-0.0900
-0.0850
-0.0800
-0.0750
-0.0700
-0.0650
-0.0600
-0.0550
-0.0500
-0.0450
-0.0400
-0.0350
-0.0300
-0.0250
-0.0200
-0.0150
-0.0100
-0.0050
0.0000
FRR
FAR

PSEUDO VASCULAR PATTERN GENERATION DEVICE AND METHOD OF GENERATING PSEUDO VASCULAR PATTERN

CROSS-REFERENCE TO RELATED APPLICATIONS

This application is a continuation of International Application No. PCT/JP2021/048352, filed on Dec. 24, 2021, the entire contents of which are incorporated herein by reference.

FIELD

The present disclosure relates to a pseudo vascular pattern generation device and a method of generating a pseudo vascular pattern.

BACKGROUND

A large amount of data on vascular patterns is needed for developments of a biometric authentication algorithm and a biometric authentication system based on vascular patterns. Conventionally, developments of the biometric authentication algorithm and the biometric authentication system have been carried out by using vascular patterns (hereinafter, sometimes referred to as "actual vascular patterns") extracted from an image in which an actual living body has been captured (hereinafter, sometimes referred to as a "captured image") has been carried out. However, if an image of a living body is actually captured in order to obtain a large amount of actual vascular patterns, a lot of time and cost are accordingly needed to collect the actual vascular patterns. Furthermore, if an image of a living body is actually captured, the actual vascular patterns extracted from the captured image correspond to data capable of identifying an individual, so that it is difficult to store the actual vascular patterns in a storage in terms of a contract with the subject to be imaged and a legal system adopted in each country. Accordingly, pseudo vascular patterns to be substituted for the actual vascular patterns are needed.

In contrast, for example, there is a known method of generating pseudo vascular patterns on the basis of a mathematical model, such as a reaction-diffusion equation, using wing patterns, Turing patterns, or the like of drosophila.

Examples of related-art is described in M. Sato, "Getting Started in Mathematical Life Sciences", ISBN: 4339067628, pp. 176-193, Corona corporation, 2020 (Date of issue: Jan. 8, 2021).

However, the shape of the pseudo vascular patterns generated on the basis of the mathematical model is far from the shape of the actual vascular patterns. Furthermore, it is hard to generate patterns that are rich in diversity in the case where a pseudo vascular pattern is generated on the basis of the mathematical model, so that it is not realistic to use the pseudo vascular patterns that have been generated on the basis of the mathematical model in order to evaluate the biometric authentication algorithm.

SUMMARY

According to an aspect of an embodiment, a pseudo vascular pattern generation device includes a processor. The processor generates a first image in which white noise has been added to a gray image, generates a second image in which the white noise included in the first image has been diffused, generates a third image in which a blood vessel enhancement filter has been applied to the second image, generates a fourth image in which a region of interest has been set to the third image, and generates a fifth image including a pseudo vascular pattern based on the fourth image.

DESCRIPTION OF EMBODIMENTS

Figure 1:
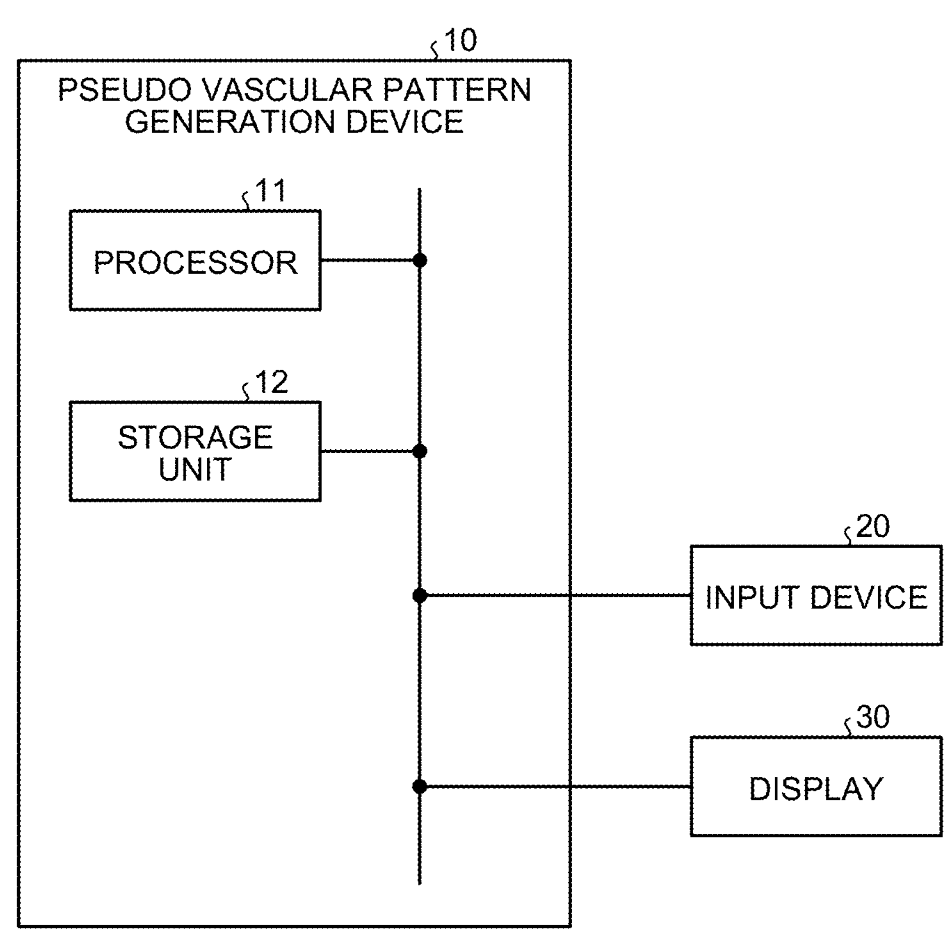
FIG. 1 is a diagram illustrating an example of a configuration of a pseudo vascular pattern generation system according to the present disclosure.

Preferred embodiments of the present disclosure will be explained with reference to accompanying drawings.

In the embodiments described below, the same reference numerals are assigned to the same configurations.

Embodiment

<Configuration of Pseudo Vascular Pattern Generation System>

FIG. 1 is a diagram illustrating an example of a configuration of a pseudo vascular pattern generation system according to the present disclosure.

In FIG. 1, the pseudo vascular pattern generation system 1 includes a pseudo vascular pattern generation device 10, an input device 20, and a display 30. The input device 20 and the display 30 are connected to the pseudo vascular pattern generation device 10. Examples of the input device 20 include, as one example, a pointing device, such as a mouse, and a keyboard. An example of the display 30 includes, as one example, a liquid crystal display (LCD).

The pseudo vascular pattern generation device 10 includes a processor 11 and a storage unit 12. Examples of the processor 11 include, as one example, a central processing unit (CPU), a digital signal processor (DSP), a field programmable gate array (FPGA), an application specific integrated circuit (ASIC), or the like. Examples of the storage unit 12 includes, as one example, a memory, a storage, or the like. The pseudo vascular pattern generation device 10 is implemented by, for example, a computer.

<Process Performed in Pseudo Vascular Pattern Generation Device>

Figure 2:
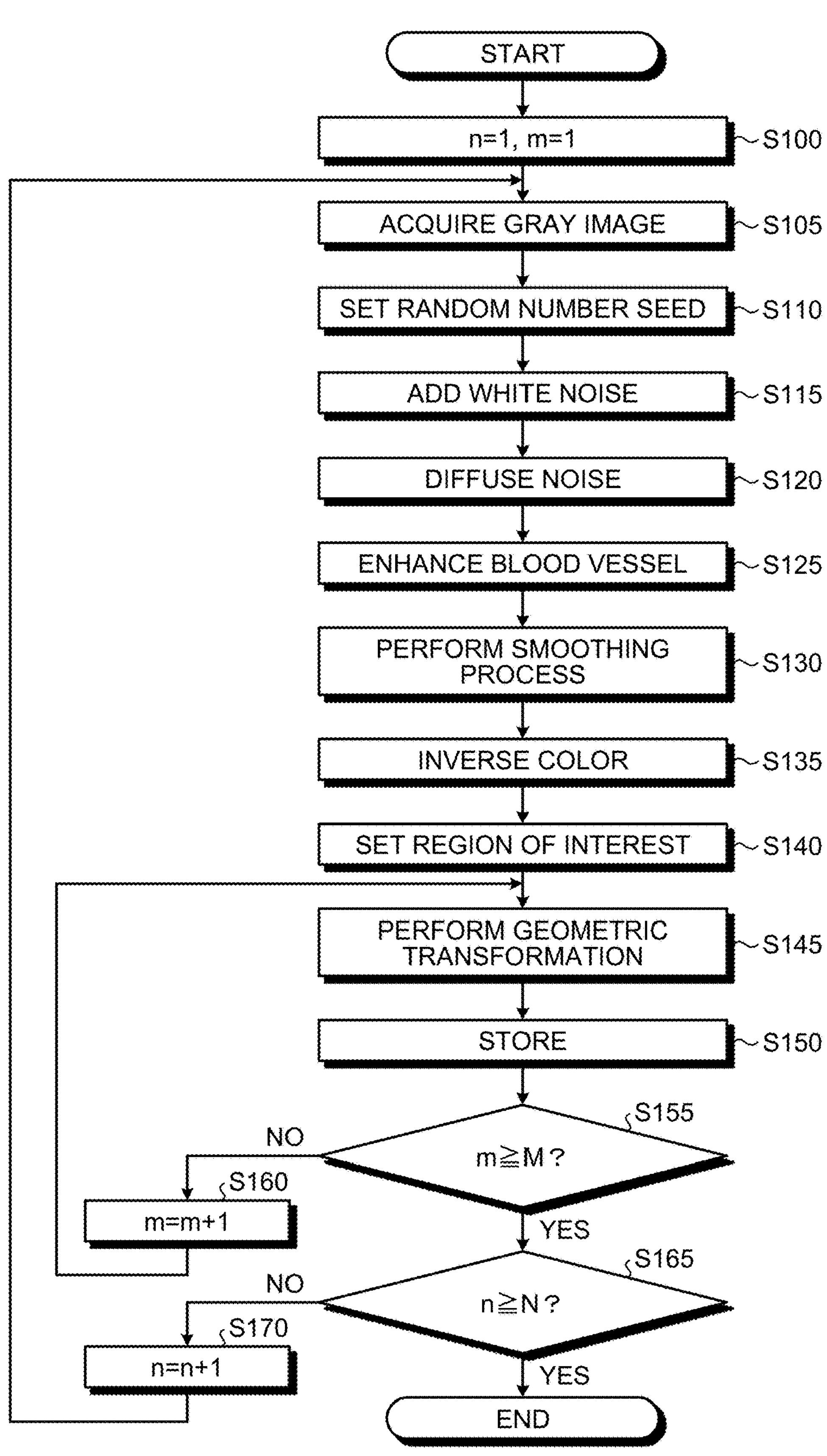
FIG. 2 is a diagram illustrating one example of the flow of the process performed in a pseudo vascular pattern generation device according to the present disclosure.
Figure 3:
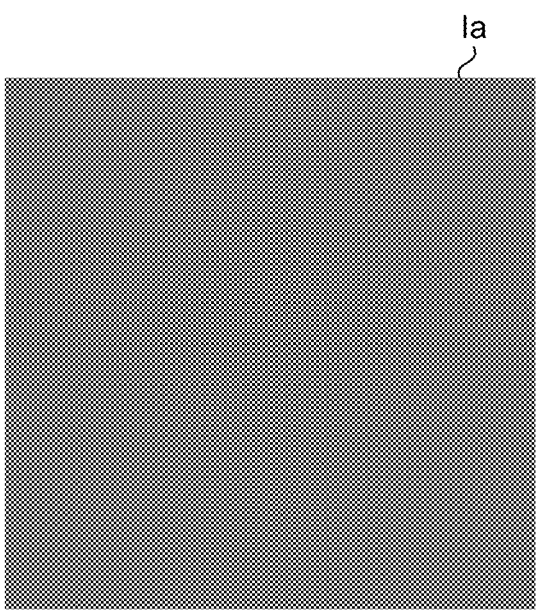
FIG. 3 is a diagram illustrating one example of an image that is obtained in a course of a process of generating pseudo vascular patterns according to the present disclosure.

FIG. 2 is a diagram illustrating one example of the flow of the process performed in the pseudo vascular pattern generation device according to the present disclosure. FIG. 3 to FIG. 11 are diagrams each illustrating one example of an image or images obtained in a course of a process of generating the pseudo vascular patterns according to the present disclosure.

In FIG. 2, at Step S100, the processor 11 initializes a value of a first counter n and a value of a second counter m to "1".

After that, at Step S105, the processor 11 acquires a gray image Ia (FIG. 3) that is stored in the storage unit 12 in advance from the storage unit 12. In the case where a gradation value of each of the pixels that constitute an image takes one of values of 0 to 255, an image in which, for example, the gradation values of all of the pixels are intermediate value of 128 that is located at a point between 0 and 255 is stored in advance as the gray image Ia in the storage unit 12.

After that, at Step S110, the processor 11 sets a random number seed.

Figure 4:
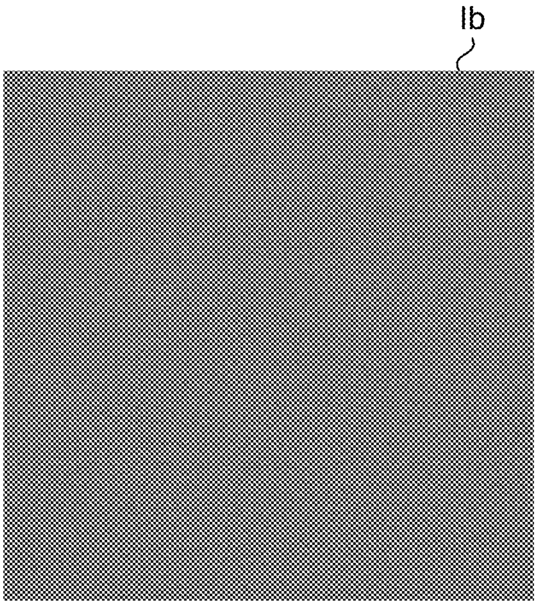
FIG. 4 is a diagram illustrating one example of an image that is obtained in a course of a process of generating the pseudo vascular patterns according to the present disclosure.

After that, at Step S115, the processor 11 adds white noise under the same random number seed to all of the pixels included in the gray image Ia. As a result of this, an image Ib in which the white noise has been added to the gray image Ia (hereinafter, sometimes referred to as a "white noise added image") is generated (FIG. 4).

Figure 5:
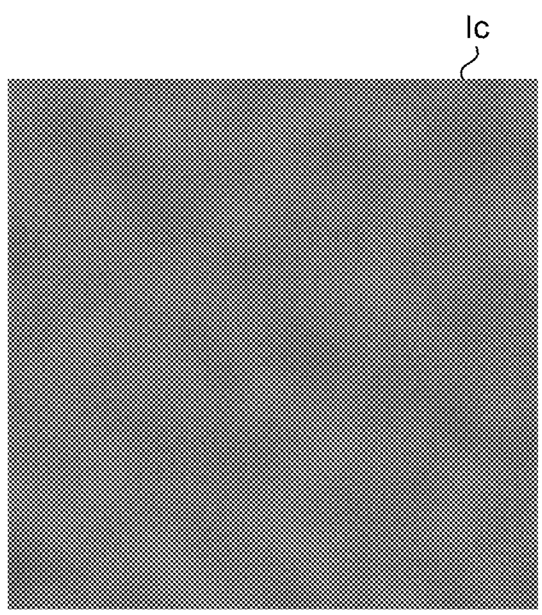
FIG. 5 is a diagram illustrating one example of an image that is obtained in a course of a process of generating the pseudo vascular patterns according to the present disclosure.

After that, at Step S120, the processor 11 diffuses the white noise included in the white noise added image Ib. The processor 11 generates, by applying, for example, a Gaussian filter to the white noise added image Ib, an image Ic in which the white noise has been diffused in the white noise added image Ib (hereinafter, sometimes referred to as a "white noise diffusion image") (FIG. 5).

Figure 6:
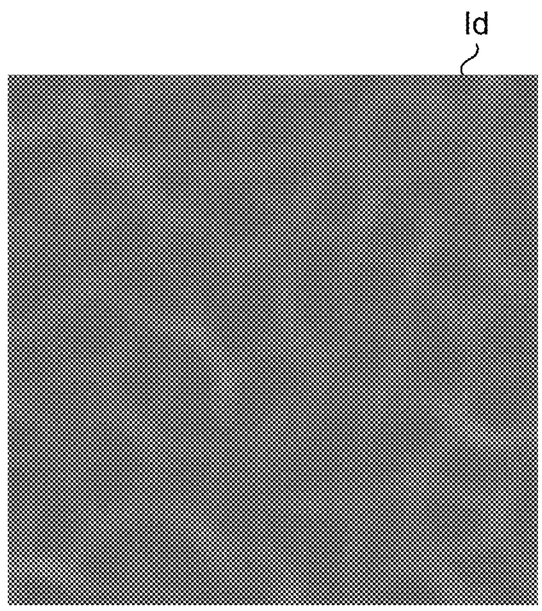
FIG. 6 is a diagram illustrating one example of an image that is obtained in a course of a process of generating the pseudo vascular patterns according to the present disclosure.

After that, at Step S125, the processor 11 enhances blood vessels included in the white noise diffusion image Ic. The processor 11 generates, by applying, for example, a blood vessel enhancement filter, such as a Frangi filter, to the white noise diffusion image Ic, an image Id in which the blood vessel has been enhanced in the white noise diffusion image Ic (hereinafter, sometimes referred to as a "vascular enhancement image") (FIG. 6).

Figure 7:
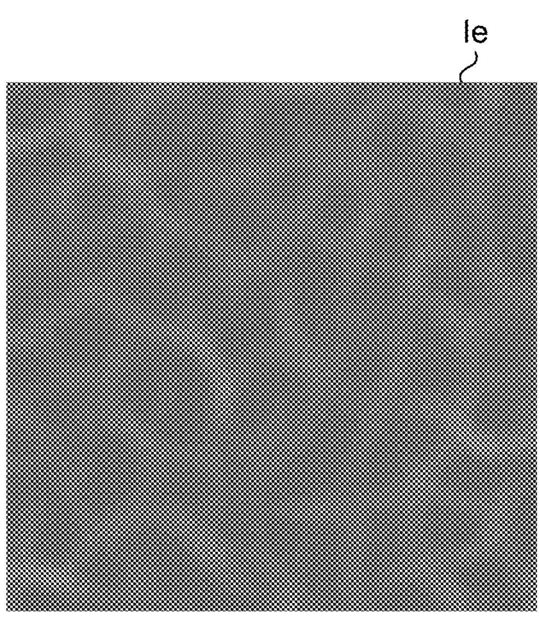
FIG. 7 is a diagram illustrating one example of an image that is obtained in a course of a process of generating the pseudo vascular patterns according to the present disclosure.

After that, at Step S130, the processor 11 performs a smoothing process on the vascular enhancement image Id. The processor 11 generates, by performing the smoothing process on the vascular enhancement image Id by using, for example, the Gaussian filter, an image Ie in which the smoothing process has been performed on the vascular enhancement image Id (hereinafter, sometimes referred to as a "smoothed image") (FIG. 7). Moreover, it is possible to omit the process performed at Step S130.

Figure 8:
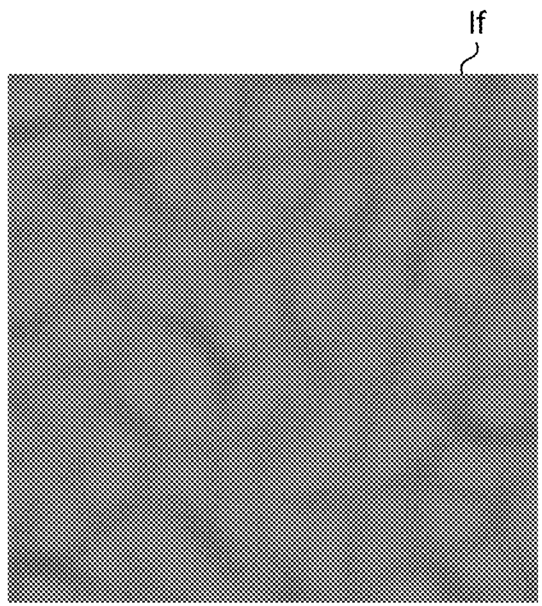
FIG. 8 is a diagram illustrating one example of an image that is obtained in a course of a process of generating the pseudo vascular patterns according to the present disclosure.

After that, at Step S135, the processor 11 inverse the color of the smoothed image Ie. As a result of this, an image If in which the smoothed image Ie has been subjected to negative-positive inversion (hereinafter, sometimes referred to as a "color inversion image") is generated (FIG. 8). Moreover, in the case where the process performed at Step S130 is omitted, at Step S135, the processor 11 generates the color inversion image If by inversing the color of the vascular enhancement image Id. Moreover, it is also possible to omit the process performed at Step S135.

Figure 9:
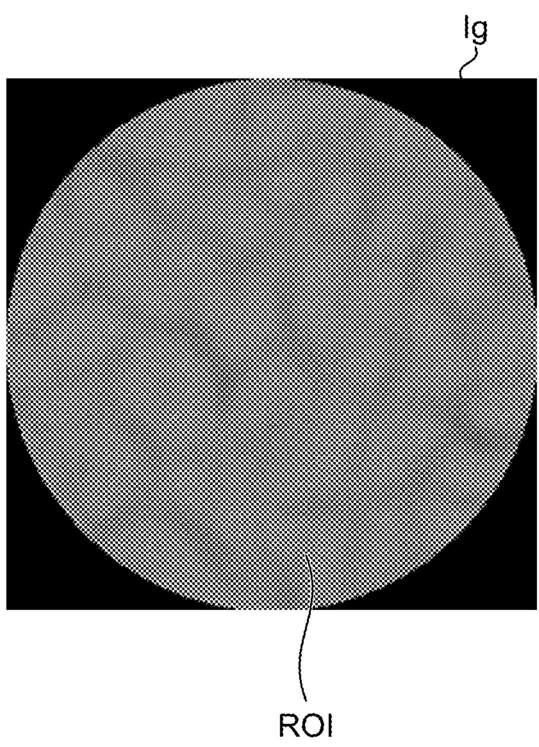
FIG. 9 is a diagram illustrating one example of an image that is obtained in a course of a process of generating the pseudo vascular patterns according to the present disclosure.

After that, at Step S140, the processor 11 sets a region of interest (ROI) to the color inversion image If. As a result of this, an image Ig in which the region of interest has been set with respect to the color inversion image If (hereinafter, sometimes referred to as a "region of interest set image") is generated (FIG. 9). Moreover, in the case where the process performed at Step S135 is omitted, at Step S140, the processor 11 sets the region of interest to the smoothed image Ie. Furthermore, in the case where the processes performed at Step S130 and Step S135 are omitted, at Step S140, the processor 11 sets the region of interest to the vascular enhancement image Id.

After that, at Step S145, the processor 11 generates, by performing geometric transformation on the region of interest set image Ig, an image BVnm that includes a pseudo vascular pattern (hereinafter, sometimes referred to as a "pseudo vascular pattern image"). Example of the geometric transformation include, as one example, affine transformation, thin plate spline transformation, and the like.

After that, at Step S150, the processor 11 causes the storage unit 12 to store the pseudo vascular pattern image BVnm that has been generated at Step S145.

After that, at Step S155, the processor 11 determines whether or not the value of the second counter m reaches a second predetermined value M. If the second counter m does not reach the second predetermined value M (No at Step S155), the process proceeds to Step S160, whereas, if the second counter m reaches the second predetermined value M (Yes at Step S155), the process proceeds to Step S165.

At Step S160, the processor 11 increments the value of the second counter m. After the process at Step S160 has been performed, the process returns to Step S145.

Figure 10:
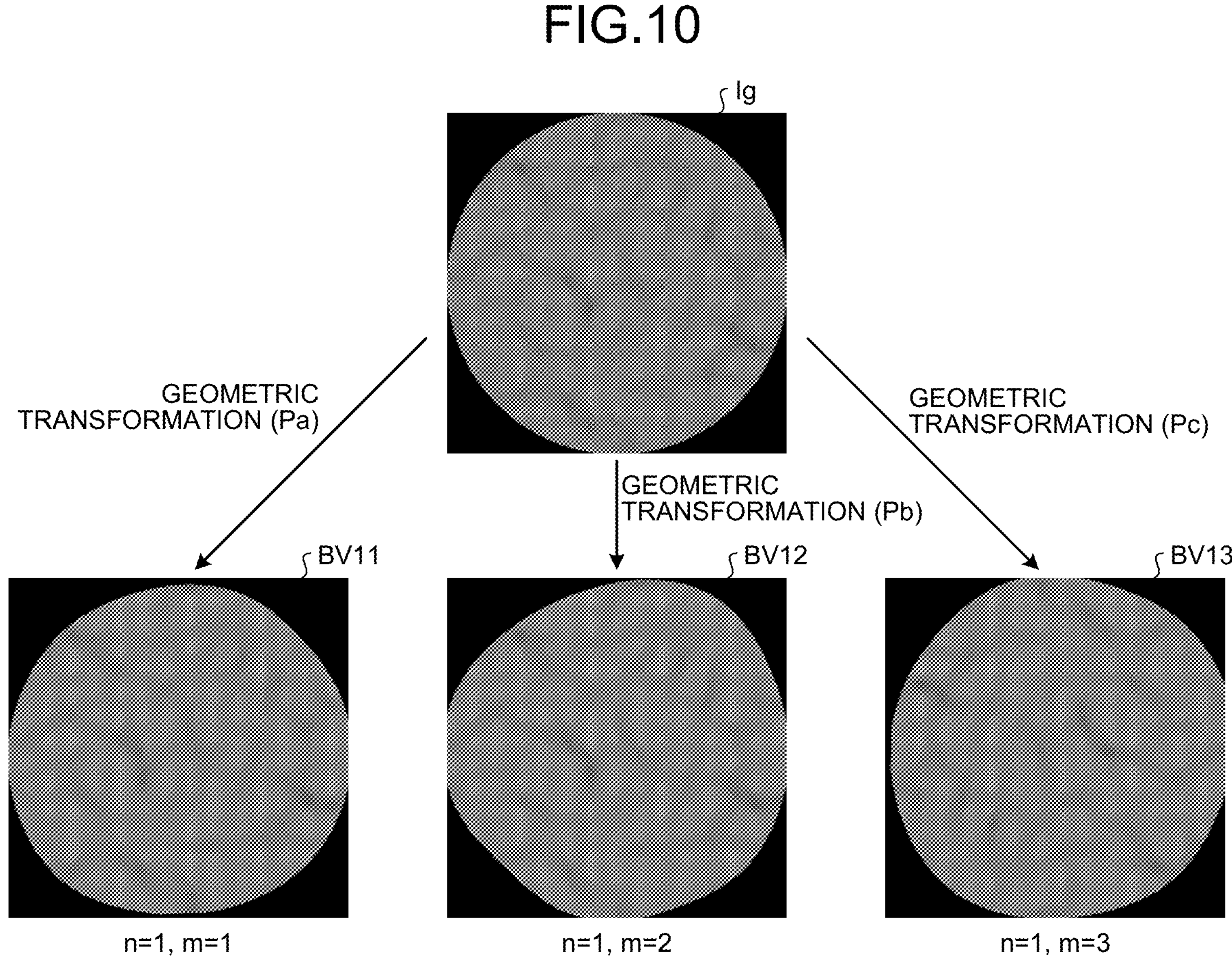
FIG. 10 is a diagram illustrating one example of images that are obtained in a course of a process of generating the pseudo vascular patterns according to the present disclosure.

Here, as illustrated in FIG. 10, the processor 11 changes, in accordance with the value of the second counter m, a value of a parameter P that is used for geometric transformation performed at Step S145. In the case where, for example, the value of the second counter m is "1", the processor 11 sets the value of the parameter P to "Pa"; in the case where the value of the second counter m is "2", the processor 11 sets the value of the parameter P to "Pb" that is different from Pa; and, in the case where the value of the second counter m is "3", the processor 11 sets the value of the parameter P to "Pc" that is different from Pa and Pb.

Accordingly, for example, in the case where the second predetermined value M is set to "3", as illustrated in FIG. 10, under the condition that the value of the first counter n is "1", in the case where the value of the second counter m is "1", a first pseudo vascular pattern image BV11 is generated as a result of the region of interest set image Ig being subjected to geometric transformation by using the parameter Pa; in the case where the value of the second counter m is "2", a second pseudo vascular pattern image BV12 is generated as a result of region of interest set image Ig being subjected to geometric transformation by using the parameter Pb; and, in the case where the value of the second counter m is "3", a third pseudo vascular pattern image BV13 is generated as a result of region of interest set image Ig being subjected to geometric transformation by using the parameter Pc.

In contrast, at Step S165, the processor 11 determines whether or not the value of the first counter n reaches a first predetermined value N. In the case where the value of the first counter n does not reach the first predetermined value N (No at Step S165), the process proceeds to Step S170, whereas, in the case where the value of the first counter n reaches the first predetermined value N (Yes at Step S165), the process ends.

At Step S170, the processor 11 increments the value of the first counter n. After the process at Step S170 has been performed, the process returns to Step S105.

Here, the processor 11 changes, in accordance with the value of the first counter n, the value of the random number seed that is to be set at Step S110. In the case where, for example, the value of the first counter n is "1", the processor 11 sets the value of the random number seed to "Sa"; in the case where, for example, the value of the first counter n is "2", the processor 11 sets the value of the random number seed to "Sb" that is different from Sa; in the case where, for example, the value of the first counter n is "3", the processor 11 sets the value of the random number seed to "Sc" that is different from Sa and Sb.

Figure 11:
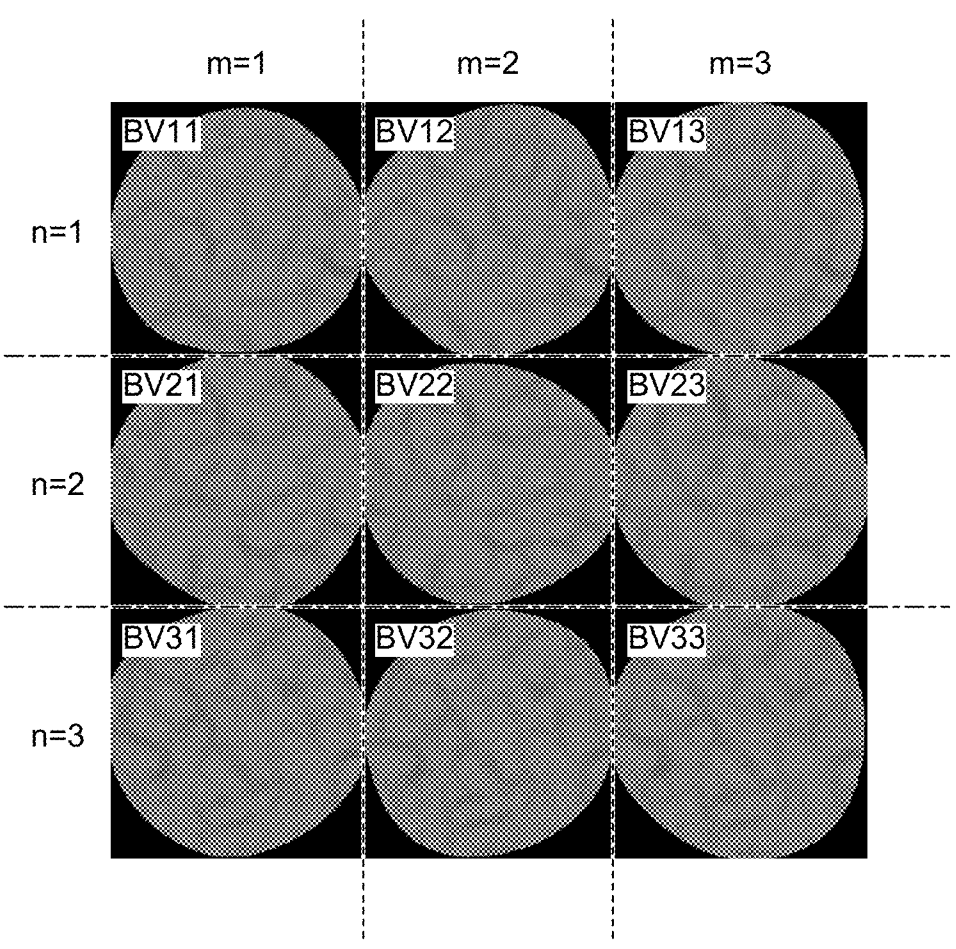
FIG. 11 is a diagram illustrating one example of images that are obtained in a course of a process of generating the pseudo vascular patterns according to the present disclosure.

Accordingly, for example, in the case where the first predetermined value N is set to "3", as illustrated in FIG. 11, under the condition that the value of the first counter n is "1", in the case where the value of the second counter m is "1", the first pseudo vascular pattern image BV11 based on the random number seed Sa and the parameter Pa is generated; in the case where the value of the second counter m is "2", the second pseudo vascular pattern image BV12 based on the random number seed Sa and the parameter Pb is generated; and in the case where the value of the second counter m is "3", the third pseudo vascular pattern image BV13 based on the random number seed Sa and the parameter Pc is generated. Furthermore, as illustrated in FIG. 11, under the condition that the value of the first counter n is "2", in the case where the value of the second counter m is "1", a fourth pseudo vascular pattern image BV21 based on the random number seed Sb and the parameter Pa is generated; in the case where the value of the second counter m is "2", a fifth pseudo vascular pattern image BV22 based on the random number seed Sb and the parameter Pb is generated; and in the case where the value of the second counter m is "3", a sixth pseudo vascular pattern image BV23 based on the random number seed Sb and the parameter Pc is generated. Furthermore, as illustrated in FIG. 11, under the condition that the value of the first counter n is "3", in the case where the value of the second counter m is "1", a seventh pseudo vascular pattern image BV31 based on the random number seed Sc and the parameter Pa is generated; in the case where the value of the second counter m is "2", an eighth pseudo vascular pattern image BV32 based on the random number seed Sc and the parameter Pb is generated; and in the case where the value of the second counter m is "3", a ninth pseudo vascular pattern image BV33 based on the random number seed Sc and the parameter Pc is generated.

Here, the first pseudo vascular pattern image BV11, the second pseudo vascular pattern image BV12, and the third pseudo vascular pattern image BV13 are generated on the basis of the parameters Pa, Pb, Pc that are different from each other under the condition of the same random number seed Sa. As a result of this, the feature points of the pseudo vascular pattern included in each of the first pseudo vascular pattern image BV11, the second pseudo vascular pattern image BV12, and the third pseudo vascular pattern image BV13 are similar with each other.

Furthermore, the fourth pseudo vascular pattern image BV21, the fifth pseudo vascular pattern image BV22, and the sixth pseudo vascular pattern image BV23 are generated on the basis of the parameters Pa, Pb, and Pc that are different from each other under the same random number seed Sb. As a result of this, the feature points of the pseudo vascular pattern included in each of the fourth pseudo vascular pattern image BV21, the fifth pseudo vascular pattern image BV22, and the sixth pseudo vascular pattern image BV23 are similar with each other.

In addition, the seventh pseudo vascular pattern image BV31, the eighth pseudo vascular pattern image BV32, and the ninth pseudo vascular pattern image BV33 are generated on the basis of the parameters Pa, Pb, Pc that are different from each other under the same random number seed Sc. As a result of this, the feature points of the pseudo vascular pattern included in each of the seventh pseudo vascular pattern image BV31, the eighth pseudo vascular pattern image BV32, and the ninth pseudo vascular pattern image BV33 are similar with each other.

In contrast, the first pseudo vascular pattern image BV11, the second pseudo vascular pattern image BV12, and the third pseudo vascular pattern image BV13 are generated on the basis of the random number seed Sa; the fourth pseudo vascular pattern image BV21, the fifth pseudo vascular pattern image BV22, and the sixth pseudo vascular pattern image BV23 are generated on the basis of the random number seed Sb; and the seventh pseudo vascular pattern image BV31, the eighth pseudo vascular pattern image BV32, and the ninth pseudo vascular pattern image BV33 are generated on the basis of the random number seed Sc. As a result of this, the feature points of the pseudo vascular pattern that are included in each of the first pseudo vascular pattern image BV11, the second pseudo vascular pattern image BV12, and the third pseudo vascular pattern image BV13, the feature points of the pseudo vascular pattern that are included in each of the fourth pseudo vascular pattern image BV21, the fifth pseudo vascular pattern image BV22, and the sixth pseudo vascular pattern image BV23, and the feature points of the pseudo vascular pattern included in each of the seventh pseudo vascular pattern image BV31, the eighth pseudo vascular pattern image BV32, and the ninth pseudo vascular pattern image BV33 are different from each other.

As a result of this, it is possible to define the pseudo vascular pattern that is included in each of the first pseudo vascular pattern image BV11, the second pseudo vascular pattern image BV12, and the third pseudo vascular pattern image BV13 as three types of variations in the pseudo vascular pattern of a first person. Furthermore, it is possible to define the pseudo vascular pattern that is included in each of the fourth pseudo vascular pattern image BV21, the fifth pseudo vascular pattern image BV22, and the sixth pseudo vascular pattern image BV23 as three types of variations in the pseudo vascular pattern of the second person who is different from the first person. Furthermore, it is possible to define the pseudo vascular pattern that is included in each of the seventh pseudo vascular pattern image BV31, the eighth pseudo vascular pattern image BV32, and the ninth pseudo vascular pattern image BV33 as three types of variations in the pseudo vascular pattern of the third person who is different from the first person and the second person.

Moreover, an operator is able to set the first predetermined value N and the second predetermined value M by using the input device 20. Furthermore, the operator is able to visually recognize the pseudo vascular pattern image BVnm by using the display 30.

<False Accept Rate (FAR) and False Reject Rate (FRR)>

Figure 12:
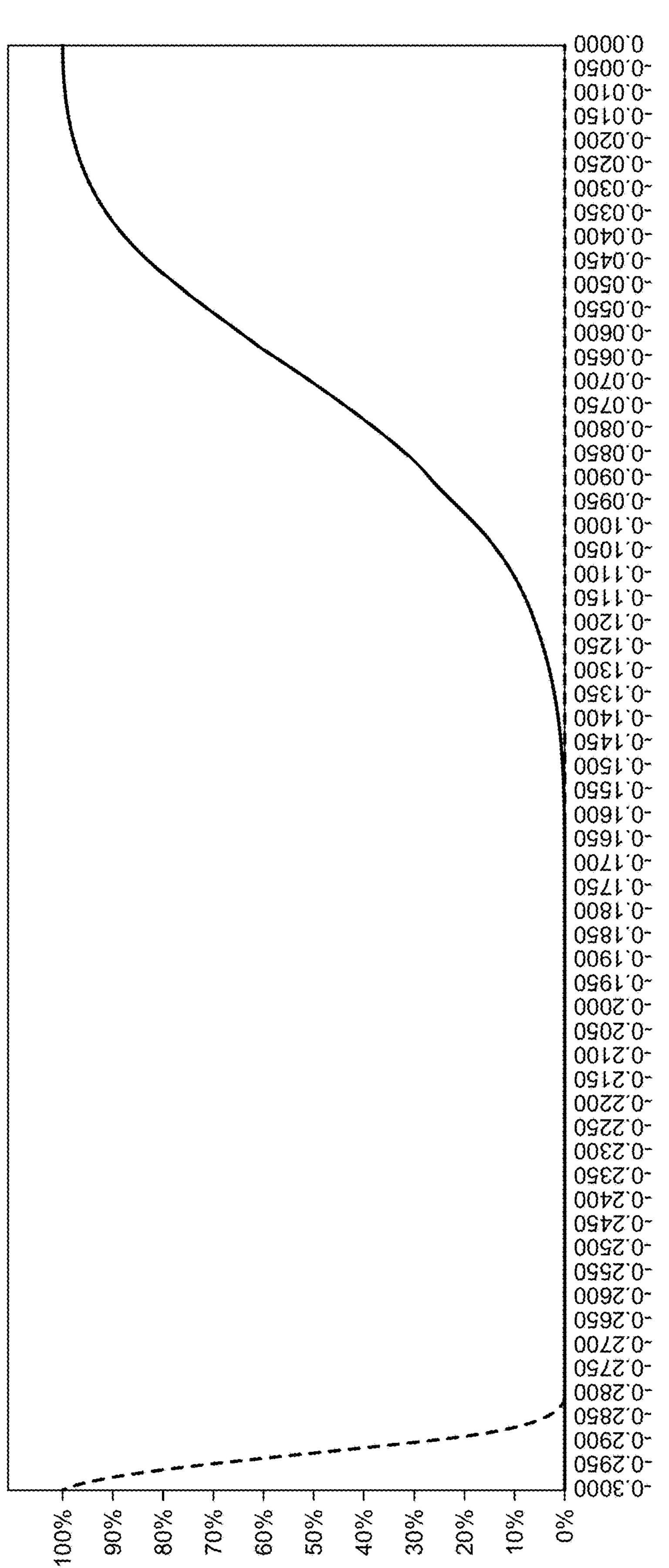
FIG. 12 is a diagram illustrating measurement results of an FAR and an FRR with respect to the pseudo vascular patterns that have been generated by the pseudo vascular pattern generation device according to the present disclosure.

FIG. 12 is a diagram illustrating the measurement results of the FAR and the FRR with respect to the pseudo vascular pattern that has been generated by the pseudo vascular pattern generation device according to the present disclosure. FIG. 12 indicates the measurement results of 133 forms obtained in the case where 1,000,000 pseudo vascular pattern images are generated by the pseudo vascular pattern generation device 10 by setting the first predetermined value N to "1000" and by setting the second predetermined value M to "1000". As illustrated in FIG. 12, in the measurement results, the FRR increases in accordance with a decrease in the FAR, and the FAR increases in accordance with a decrease in the FRR. Furthermore, in the measurement results, the FAR becomes 0% at −0.2420 or over, whereas the FRR becomes 0% at −0.1874 or below. In this way, the 1,000,000 pseudo vascular patterns that are included in the 1,000,000 pseudo vascular pattern images generated by the pseudo vascular pattern generation device 10 are rich in diversity in that the same person has similar feature points and, in contrast, different persons have different feature points, so that these 1,000,000 pseudo vascular patterns satisfy the ideal relationships between the FAR and the FRR that are the major indices that are used for the evaluation of the biometric authentication algorithm.

In the above, the embodiment has been described.

As described above, the pseudo vascular pattern generation device according to the present disclosure (the pseudo vascular pattern generation device 10 according to the embodiment) includes a processor (the processor 11 according to the embodiment). The processor generates the first image (the white noise added image Ib according to the embodiment) in which white noise has been added to a gray image (the gray image Ia according to the embodiment), generates the second image (the white noise diffusion image Ic according to the embodiment) in which the white noise included in the first image has been diffused, the third image (the vascular enhancement image Id according to the embodiment) in which the blood vessel enhancement filter has been applied to the second image, generates the fourth image (the region of interest set image Ig according to the embodiment) in which region of interest has been set to the third image, and generates the fifth image (the pseudo vascular pattern image BVnm according to the embodiment) including a pseudo vascular pattern on the basis of the fourth image.

For example, the processor adds the white noise to the gray image on the basis of a plurality of random number seeds that are different from each other.

Furthermore, for example, the processor generates the fifth image by performing geometric transformation on the fourth image by using a plurality of parameters that are different from each other.

By doing so, it is possible to generate pseudo vascular patterns that are rich in diversity.

According to the disclosed technology, it is possible to generate pseudo vascular patterns that are rich in diversity.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pseudo vascular pattern generation device comprising:
- a processor that
  - generates a first image in which white noise has been added to all of pixels included in a single gray image among a plurality of gray images under a same random number seed,
  - generates a second image in which the white noise included in the first image has been diffused by applying a Gaussian filter to the first image,
  - generates a third image in which a Frangi filter has been applied to the second image,
  - generates a fourth image in which a region of interest has been set to the third image, and
  - generates a fifth image including a pseudo vascular pattern by performing geometric transformation on the fourth image.

2. The pseudo vascular pattern generation device according to claim 1, wherein the processor adds the white noise to the single gray image based on the same random number seed for all of pixels included in the single gray image and a random number seed that is different for each other gray image of the plurality of gray images.

3. The pseudo vascular pattern generation device according to claim 1, wherein the fifth image is among a plurality of mutually different fifth images, and the processor generates the plurality of mutually different fifth images by performing the geometric transformation on the fourth image by using a plurality of parameters that are different from each other under the same random number seed.

4. A method of generating a pseudo vascular pattern comprising:
- generating a first image in which white noise has been added to all of pixels included in a single gray image under a same random number seed;
- generating a second image in which the white noise included in the first image has been diffused by applying a Gaussian filter to the first image;
- generating a third image in which a Frangi filter has been applied to the second image;
- generating a fourth image in which a region of interest has been set to the third image; and
- generating a fifth image including the pseudo vascular pattern by performing geometric transformation on the fourth image.

* * * * *